US008122435B2

(12) United States Patent
Iguchi et al.

(10) Patent No.: US 8,122,435 B2
(45) Date of Patent: Feb. 21, 2012

(54) OPERATING STATUS MONITORING PROGRAM, METHOD AND DEVICE

(75) Inventors: Masayuki Iguchi, Kawasaki (JP); Haruhisa Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1228 days.

(21) Appl. No.: 11/709,268

(22) Filed: Feb. 22, 2007

(65) Prior Publication Data

US 2007/0288799 A1    Dec. 13, 2007

(30) Foreign Application Priority Data

Jun. 9, 2006  (JP) ................................ 2006-161291

(51) Int. Cl.
  *G06F 9/44*  (2006.01)
  *G06F 11/00*  (2006.01)
(52) U.S. Cl. ........ 717/124; 717/127; 717/128; 714/38.1
(58) Field of Classification Search .................. None
  See application file for complete search history.

(56) References Cited

U.S. PATENT DOCUMENTS

| 5,339,431 | A | * | 8/1994 | Rupp et al. ................ 717/162 |
| 5,371,747 | A | * | 12/1994 | Brooks et al. .................. 714/38 |
| 5,446,900 | A | * | 8/1995 | Kimelman .................. 717/124 |
| 5,535,329 | A | * | 7/1996 | Hastings .................... 714/35 |
| 5,859,963 | A | * | 1/1999 | O'Dowd et al. ............. 714/38.1 |
| 5,933,640 | A | * | 8/1999 | Dion ........................ 717/132 |
| 6,016,556 | A | * | 1/2000 | Heath ....................... 714/38.1 |
| 6,049,666 | A | * | 4/2000 | Bennett et al. ............. 717/130 |
| 6,895,578 | B1 | * | 5/2005 | Kolawa et al. ............. 717/130 |
| 7,395,527 | B2 | * | 7/2008 | DeWitt et al. .............. 717/127 |
| 7,421,681 | B2 | * | 9/2008 | DeWitt et al. .............. 717/128 |
| 7,653,899 | B1 | * | 1/2010 | Lindahl et al. ............. 717/128 |
| 2002/0129336 | A1 | * | 9/2002 | Bolding et al. ............. 717/124 |
| 2003/0033592 | A1 | * | 2/2003 | Tsubata et al. ............. 717/128 |
| 2003/0196188 | A1 | * | 10/2003 | Kuzmin ..................... 717/124 |
| 2004/0083331 | A1 | * | 4/2004 | Gschwind et al. ............. 711/5 |
| 2005/0071816 | A1 | * | 3/2005 | Levine et al. .............. 717/127 |

(Continued)

FOREIGN PATENT DOCUMENTS

JP        64-021547 A        1/1989

(Continued)

OTHER PUBLICATIONS

Rosenberg. J. How Debuggers Work: Algorithms, Data Structures, and Architecture. N.Y., John Wiley & Sons, 1996. pp. i-256.*

(Continued)

*Primary Examiner* — Thuy Dao
*Assistant Examiner* — Todd Aguilera
(74) *Attorney, Agent, or Firm* — Fujitsu Patent Center

(57) ABSTRACT

An operating status monitoring device detects execution of a machine instruction included in an execution module that is obtained by translating a source program into machine language, specifies a step in the source program corresponding to the detected machine instruction with reference to a definition list that stores correspondence between each step in the source program and a machine instruction in the execution module, updates a data table, which defines correspondence between a step position in the source program and the execution count of the step, by adding the execution count of the specified step in the data table, and outputs an operating status map in which execution count of each step can be visually recognized by arranging unit marks and by changing a displaying pattern of each unit mark in response to the execution count.

12 Claims, 10 Drawing Sheets

U.S. PATENT DOCUMENTS

Figure 1:
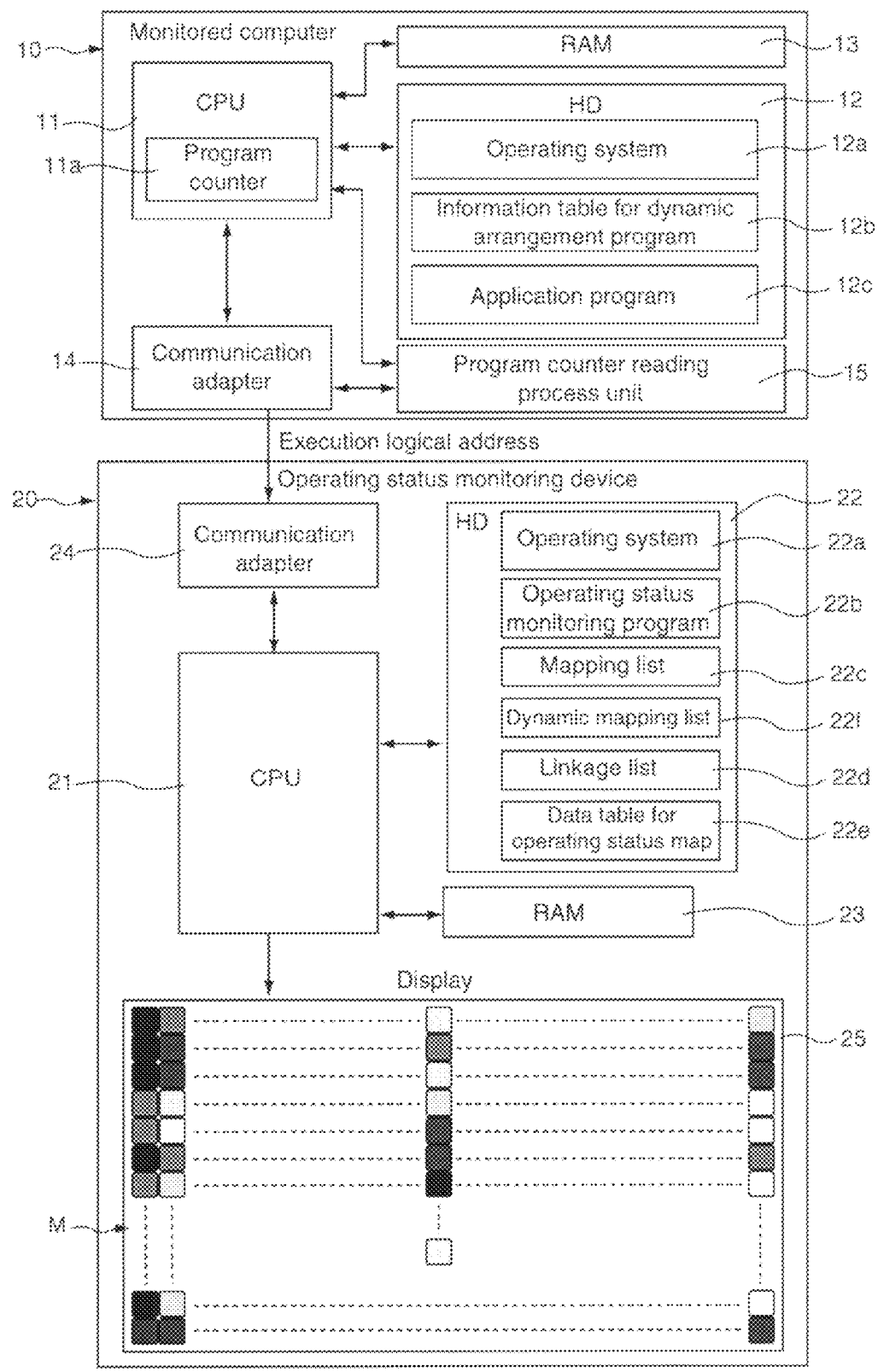

| | | | |
|---|---|---|---|
| 2006/0218535 A1* | 9/2006 | Delmonte et al. | 717/127 |
| 2006/0230385 A1* | 10/2006 | Chang et al. | 717/127 |
| 2007/0006137 A1* | 1/2007 | Savagaonkar et al. | 717/106 |
| 2007/0204259 A1* | 8/2007 | Wilner et al. | 717/124 |

FOREIGN PATENT DOCUMENTS

| | | |
|---|---|---|
| JP | 5-241913 A | 9/1993 |
| JP | 06-222913 | 8/1994 |
| JP | 06-337777 | 12/1994 |
| JP | 7-160531 A | 6/1995 |
| JP | 10-289123 A | 10/1998 |
| JP | 2002-073371 A | 3/2002 |

OTHER PUBLICATIONS

Gilmour, P., "How to Select Tools for Microcontroller Software." IEEE Spectrum [online], 1991 [retrieved Nov. 1, 2011], Retreived from Internet: <http://ieeexplore.ieee.org/xpls/abs_all.jsp?arnumber=100908>, pp. 37-39.*

Hanson, D., "A Simple and Extensible Graphical Debugger." PRoceedings of the USENIX 1997 Annual Technical Conference [online], 1997 [retrieved Nov. 1, 2011], Retrieved from Internet: <http://citeseerx.ist.psu.edu/viewdoc/download?doi=10.1.1.41.1169&rep=rep1&type=pdf>, pp. 1-12.*

Japanese Notice of Reason for Rejection, English-language translation, mailed Dec. 14, 2010 for corresponding Japanese Application No. 2006-161291.

Miura, "Windows 2000 Device Driver Programming Guide", English-language translation, The Third Guide, MSJ, ASCII Corp., Apr. 18, 2000, No. 66, pp. 10-18.

* cited by examiner

OPERATING STATUS MONITORING PROGRAM, METHOD AND DEVICE

This application claims the benefit of Japanese Patent Application No. 2006-161291 filed on Jun. 9, 2006 in the Japanese Patent Office, the disclosure of which is herein incorporated in its entirety by reference.

BACKGROUND OF THE INVENTION

The present invention relates to an operating status monitoring program that gives a computer a function to monitor operating status of a program that is executed on a computer. The present invention further relates to an operating status monitoring method and an operating status monitoring device that are implemented by a computer on which such a program is running.

Many private enterprises and self-governing bodies use computers for their businesses. The number of business programs increases with the passage of time because new programs are added in response to changes of their businesses and organizations, and there is risk to delete the existing programs. However, only a part of the programs actually operates in some cases even if the number of the programs increases. In such a case, a maintenance fee is paid to the programs that are not actually used and the unnecessary programs consume the capacity of a storage device vainly.

Therefore, the method that monitors operating status of programs in a system to list no-operating programs as deletion targets has been suggested. For example, JP2004-259036A discloses an operating status monitoring device that includes a monitoring means that collects information about processes executed by an operating system using a program interface and monitors the execution status of the processes, and a creating means that summarizes the execution status of the processes about application software included in the information collected by the monitoring means to create an operating track record of the application software.

However, since the conventional device disclosed in JP2004-259036A monitors the operating status on a process-by-process basis or a program-by-program basis, a program that consists of a small necessary part and a large unnecessary part remains as-is. That is, such a program is not a target to be deleted. In order to use a storage device effectively and to increase an execution speed of a program, the operating status monitoring method on a process-by-process basis or a program-by-program basis is insufficient. An operating status monitoring method on a step-by-step basis of a source program is required.

When a program must be monitored on a step-by-step basis, a programmer analyzed a source program on paper, a tracing program was embedded in the operating system to check an executed step, or a CPU emulator was used to check a running address preciously. However, since the conventional methods required very difficult operations in technique, they were difficult to be executed by a user who is not an advanced specialist of a computer.

SUMMARY OF THE INVENTION

The present invention has been developed in view of the above-mentioned problems in the prior art and an object of the present invention is to provide a program that makes a computer function as a device by which a user who is not an advanced specialist of a computer can easily monitor operating status of a program on a step-by-step basis.

In order to achieve the above-mentioned object, an operating status monitoring program according to the present invention, which monitors operating status of a program executed by a computer, controls a computer to execute: a detection function to detect execution of a machine instruction included in an execution module that is obtained by translating a source program into machine language and is mapped to a memory space; a step position specification function to specify a step in the source program corresponding to the detected machine instruction with reference to a definition list that stores information about correspondence between each step in the source program and a machine instruction in the execution module; an update function to update a data table for an operating status map, which defines correspondence between a step position in the source program and the execution count of the step, by adding the execution count of the step specified by the step position specification function in the data table; and an output function to output an operating status map in which execution count of each step can be visually recognized by arranging unit marks each of which corresponds to each step in a one-to-one relationship and by changing a displaying pattern of each unit mark in response to the execution count of the corresponding step based on the contents stored in the data table for an operating status map.

The above-mentioned definition list may link a step in a source program with a machine instruction in an execution module directly. However, to increase general versatility, the definition list should consist of two lists, that is, a linkage list and a mapping list. The linkage list defines correspondence between each step of a source program and a relative address of a machine instruction in a load module that is obtained by translating the source program into machine language. The mapping list defines an absolute address in a memory space on which the execution module is mapped. In the latter case, the step position specification function refers to the mapping list based on the absolute address of the executed machine instruction, thereby specifying the program that contains the executed machine instruction. And then, the step position specification function refers to the linkage list based on the relative address that is produced by subtracting the absolute address of the head of the execution module from the absolute address of the executed machine instruction, thereby specifying the step in the source program corresponding to the executed machine instruction.

If the execution module is a dynamic arrangement program whose absolute address in the memory space is defined dynamically, the above-mentioned definition list contains a dynamic mapping list that saves a dynamic mapping and a linkage list that defines correspondence between each step of a source program and a relative address of a machine instruction in a load module that is obtained by translating the source program into machine language. With this construction, the step position specification function refers the dynamic mapping list based on the absolute address of the executed machine instruction, thereby specifying the program that contains the executed machine instruction. And then, the step position specification function refers the linkage list based on the relative address that is produced by subtracting the absolute address of the head of the execution module from the absolute address of the executed machine instruction, thereby specifying the step in the source program corresponding to the executed machine instruction.

Preferably, the operating status monitoring program of the present invention controls a computer to further execute: an extraction function to extract steps whose execution counts are smaller than a predetermined default value from the data table for the operating status map; a list output function to output the information that specifies the extracted steps and the information that specifies the programs containing the extracted steps, as a list.

The above-mentioned output function preferably shows the operating status map on a display connected to the computer, and changes the luminosity or the color of a unit mark according to the execution count. The operating status map may be printed out on paper.

Preferably, the operating status monitoring program of the present invention controls a computer to further execute: a discriminating display function to display the unit marks corresponding to all the steps of the program that contains a step designated by a user so as to discriminate from the unit marks corresponding to steps of another execution module.

According to the program of the present invention constituted as mentioned above, since the execution count is counted on a step-by-step basis in a source program and can be outputted in visible form, the operating status of a program can be easily monitored on a step-by-step basis in a source program by a user even if he or she is not an advanced specialist of a computer. Therefore, the program can provide judgment information for amendment and deletion of a program on a step-by-step basis. Since a daily operating status can be monitored in real time, an unnecessary program and an unused step can be deleted any time.

When the definition list consists of the mapping list and the linkage list, the mapping list serves as a configuration peculiar to the computer concerned, while the linkage list becomes common about the program concerned. Therefore, the same linkage list can be used when executing on other computers. A list that is outputted from translating programs (compiler and linker) when a source program is translated (compiled and linked) to create a machine instruction can be used as the linkage list.

When the operating status monitoring program includes the extraction function and the list output function, the program can automatically extract a step with little execution count and show it to a user. A user can delete an unnecessary step based on the list and can reexamine a logic of a program.

Further, when the operating status monitoring program includes the discriminating display function, a user can easily specify a program that contains a specific step based on the operating status map. Therefore, when a user finds a area where no-accessed steps or infrequently accessed steps are concentrated, the user can easily distinguish which program includes these steps, which can provide a judgmental standard for deletion by grasping the operating status on a program-by-program basis.

DESCRIPTION OF THE ACCOMPANYING DRAWINGS

Figure 2:
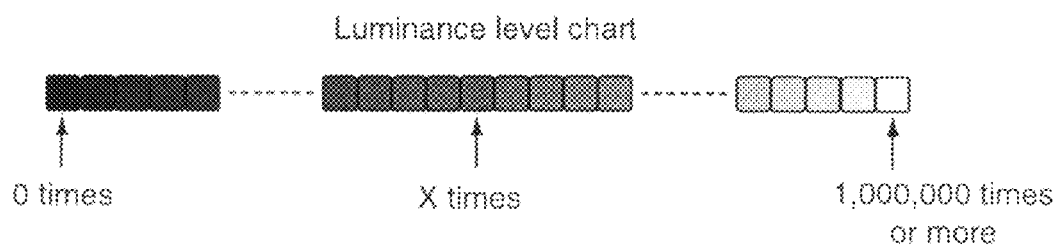
Figure 3:
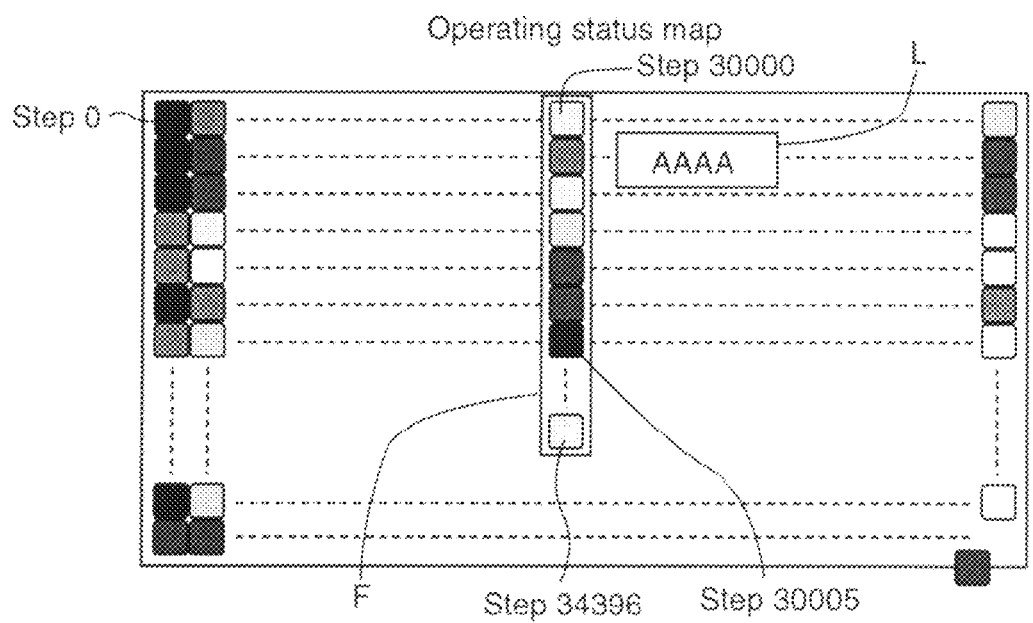
Figure 4:
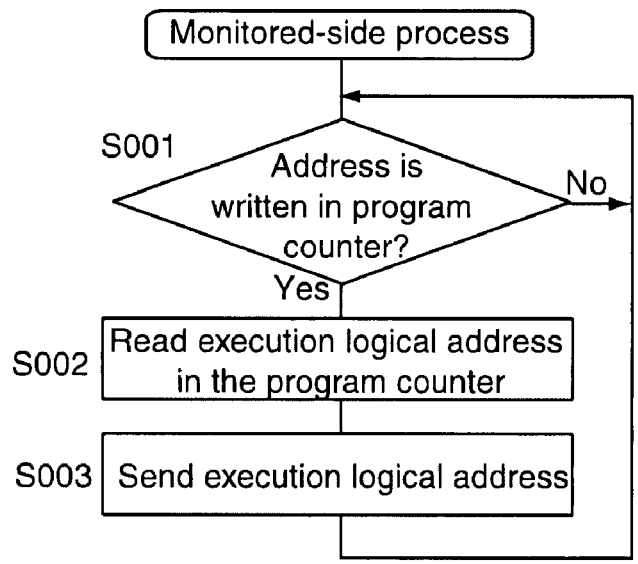
Figure 5:
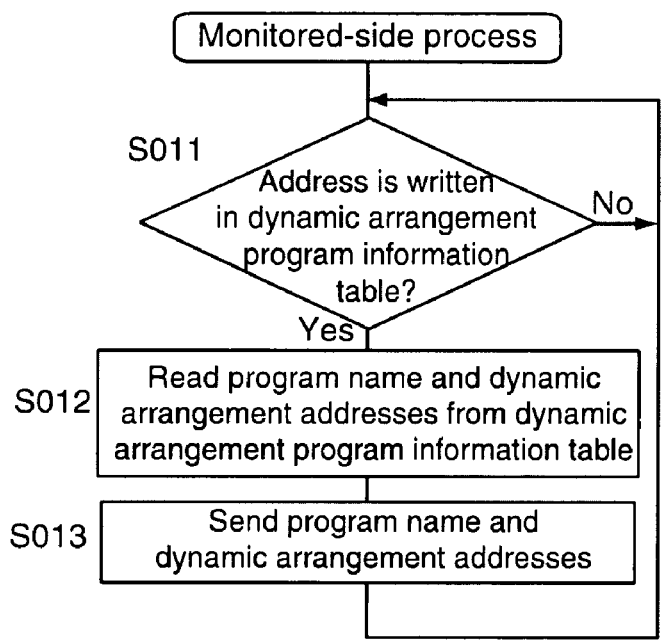
Figure 6:
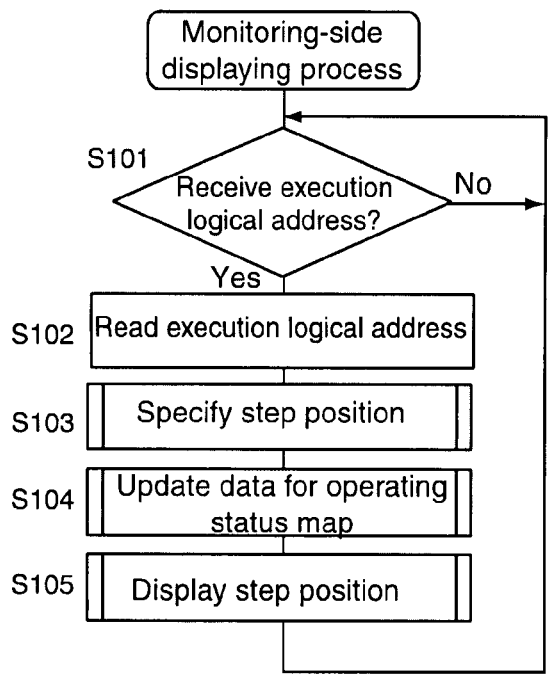
Figure 7:
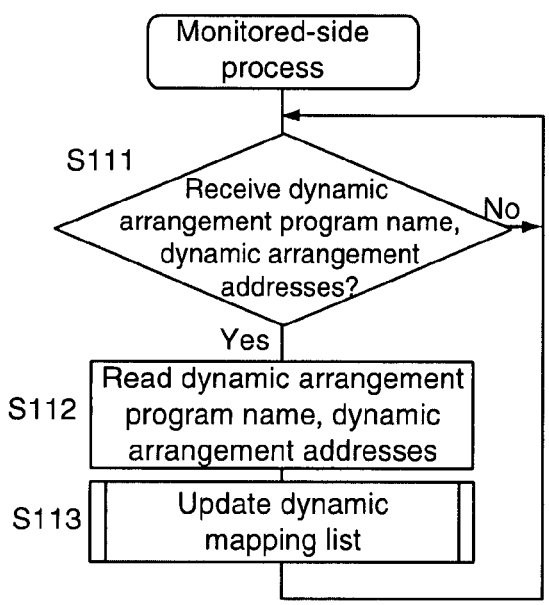
Figure 8:
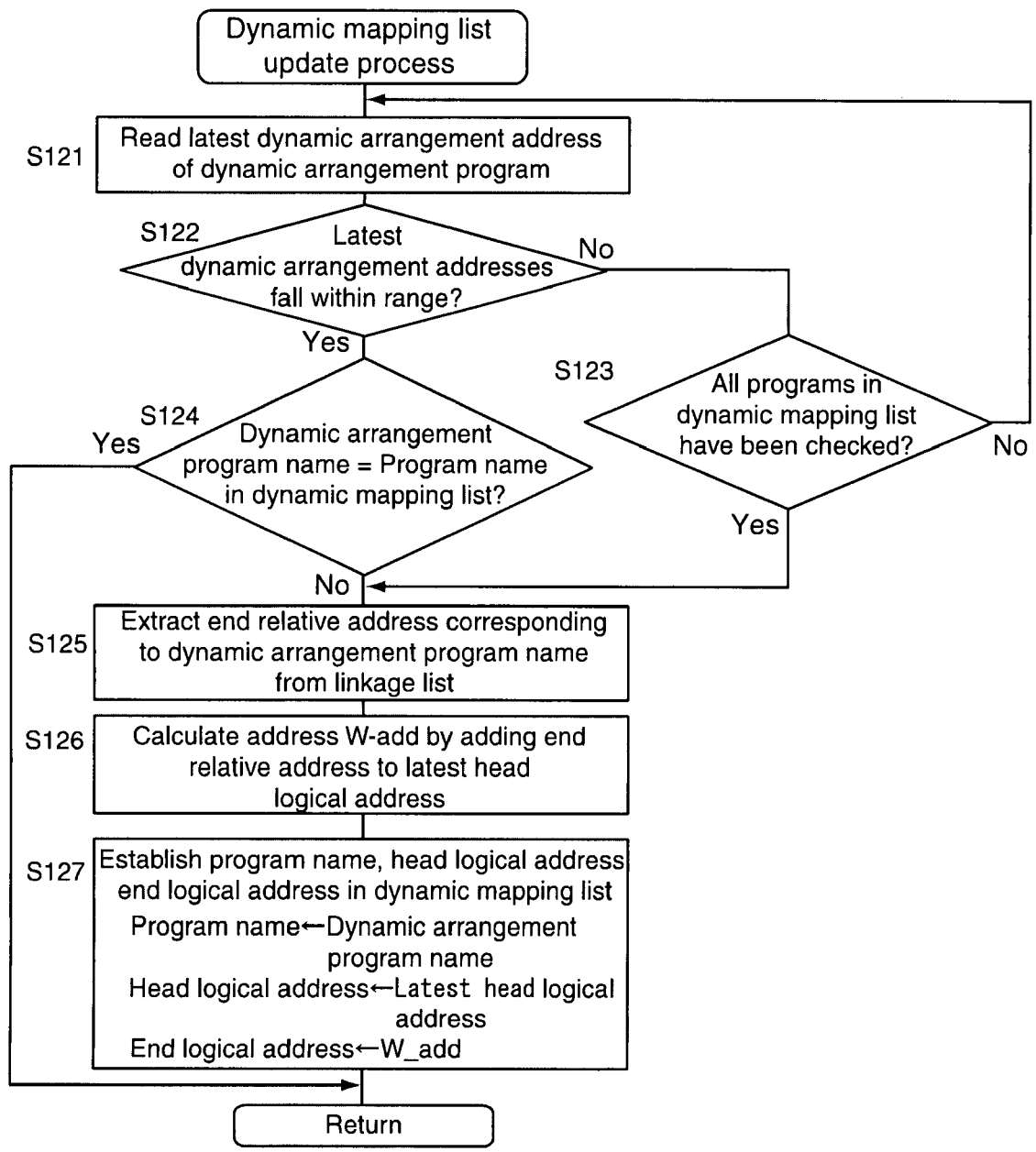
Figure 9:
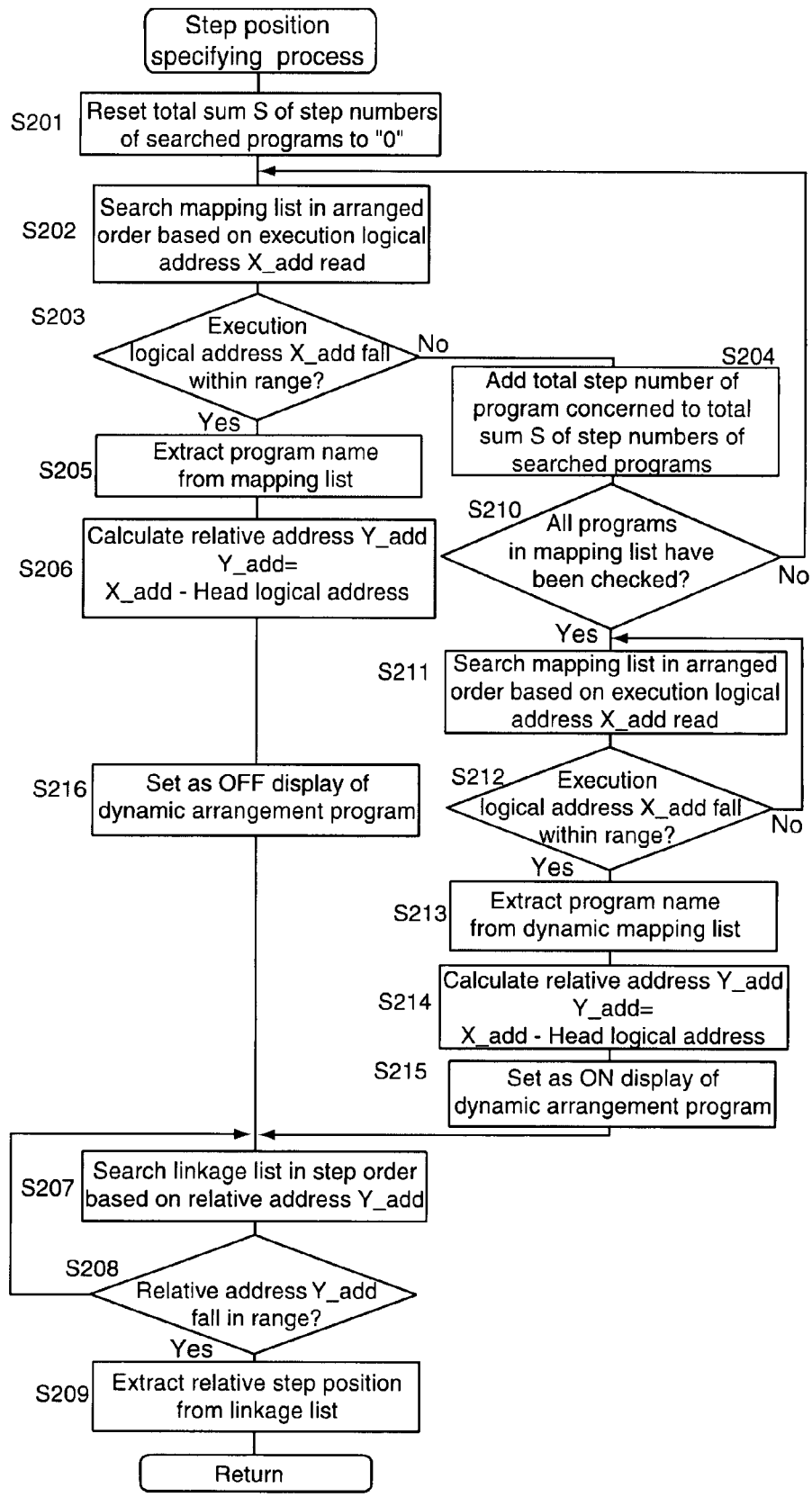
Figure 10:
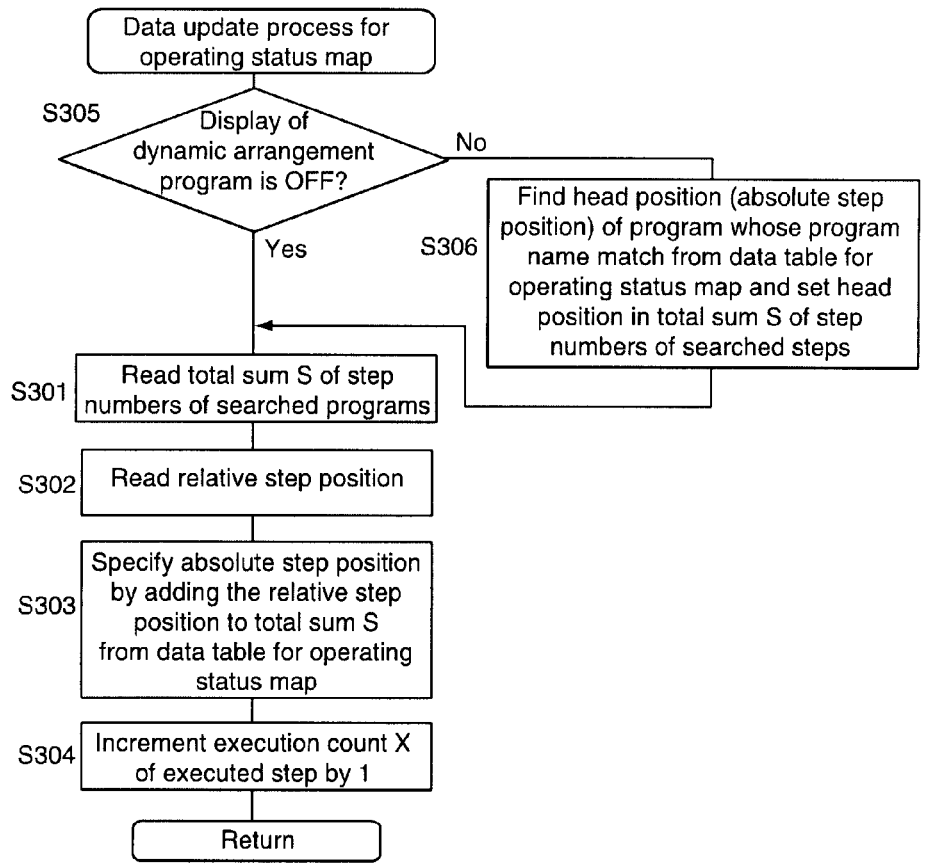
Figure 11:
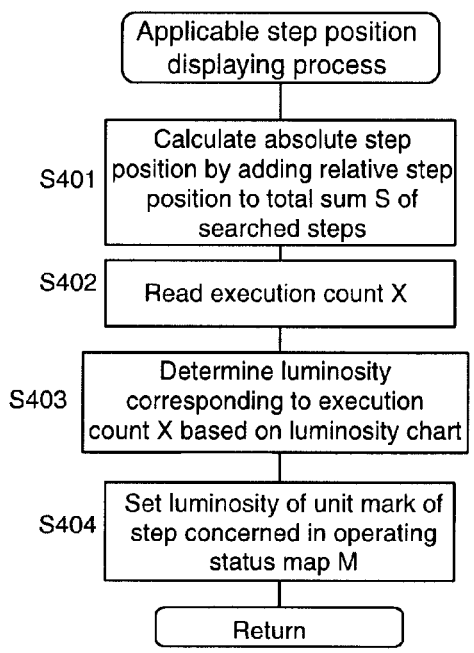
Figure 12:
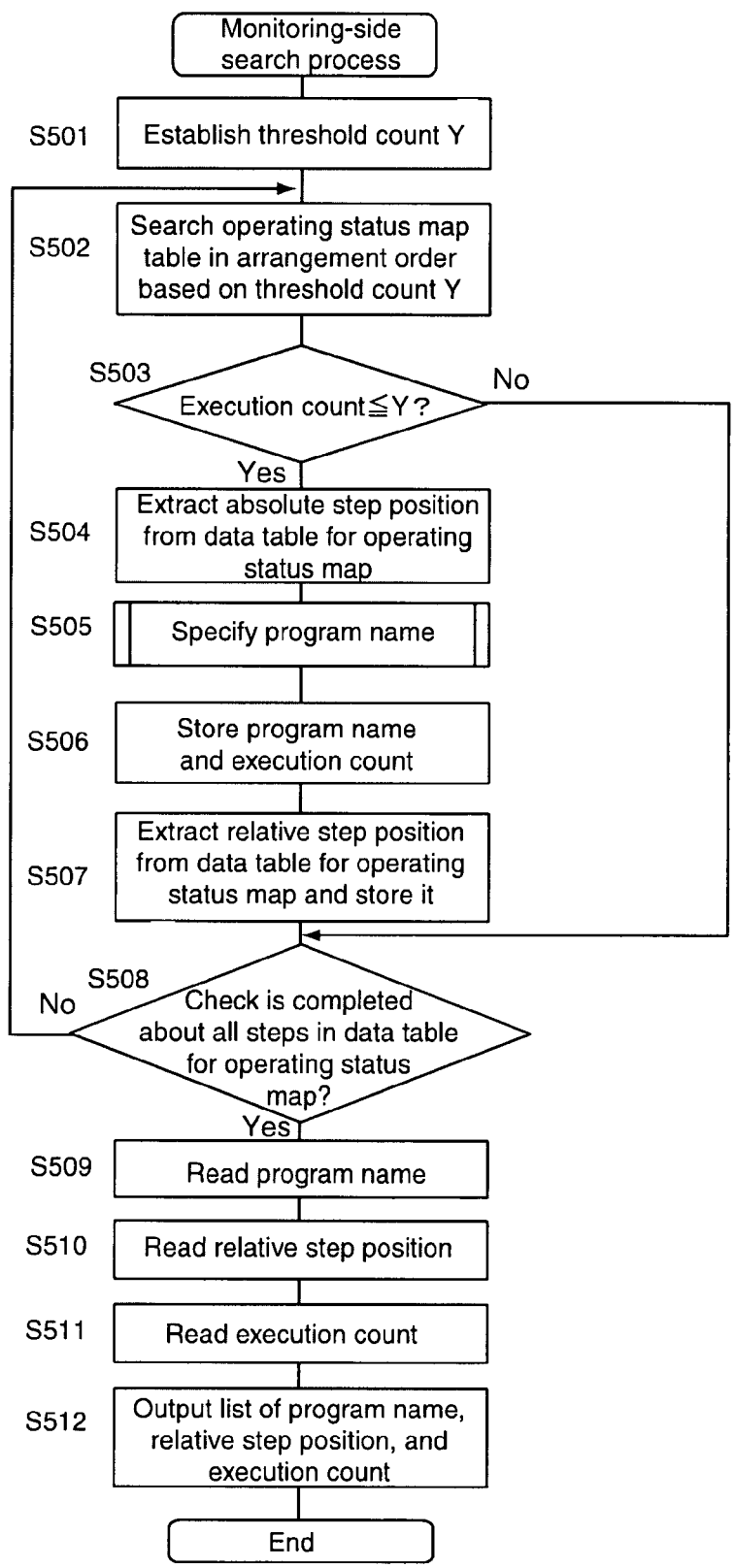
Figure 13:
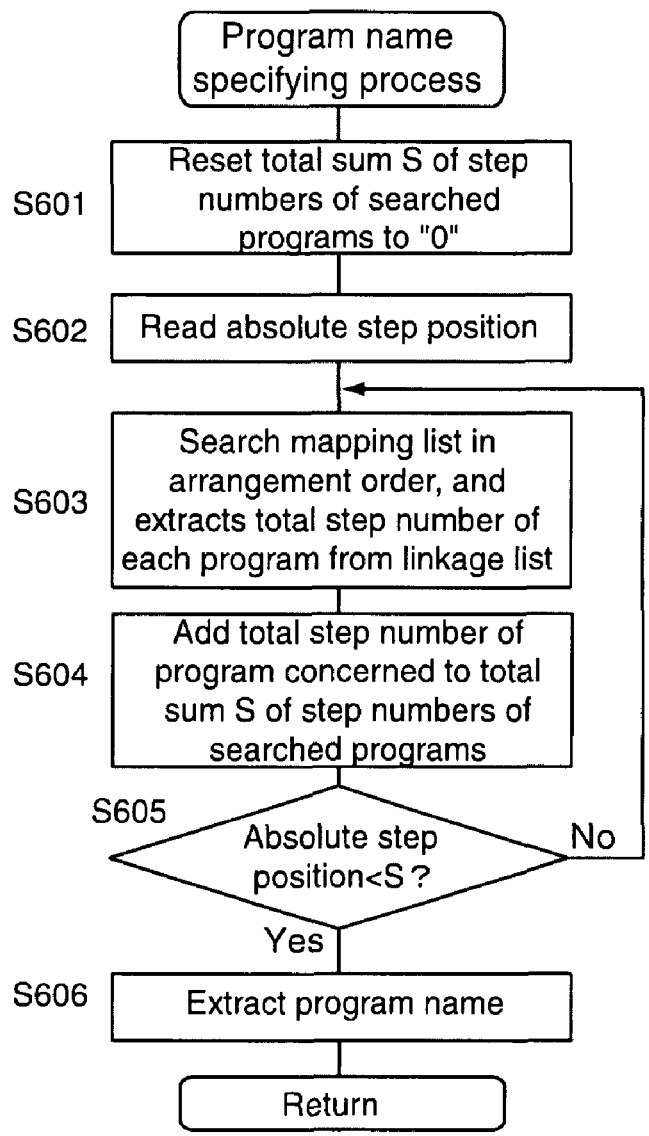
Figure 14:
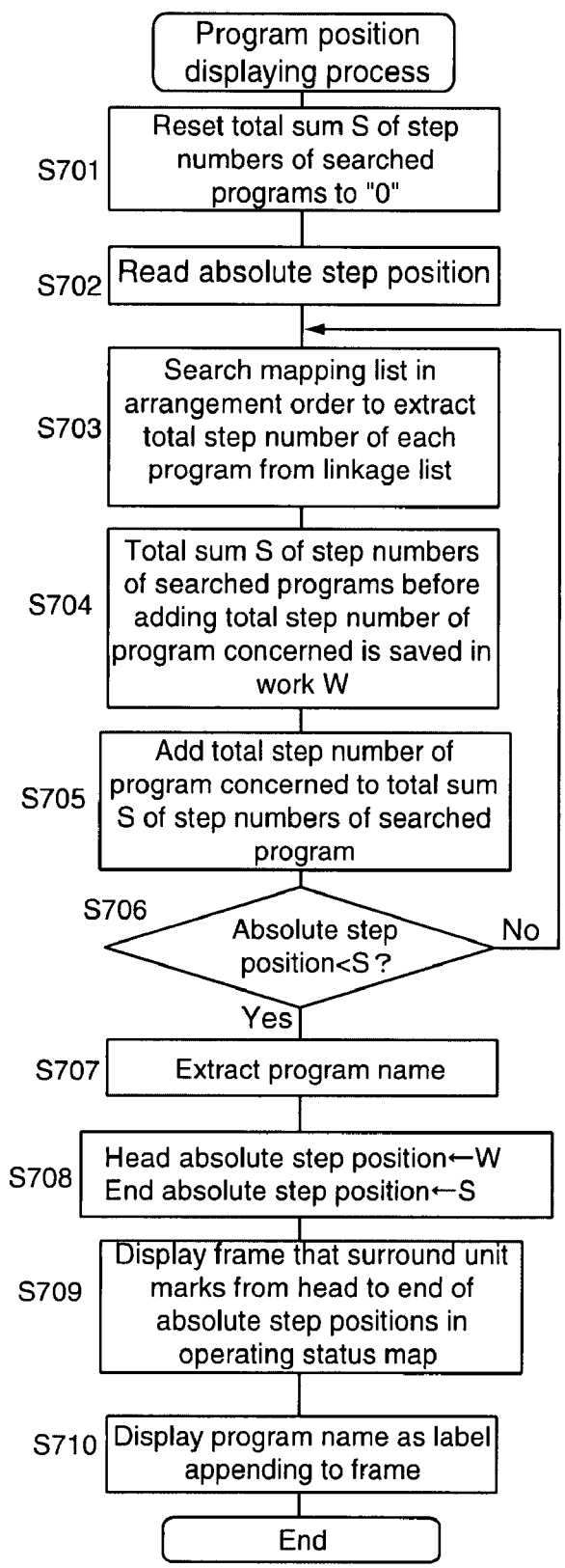

FIG. 1 is a block diagram showing a computer system to which the operating status monitoring program according to an embodiment of the present invention is applied, FIG. 2 is a luminosity chart of unit marks displayed on a display of the operating status monitoring device shown in FIG. 1, FIG. 3 is an illustration of an operating status map displayed on the display of the operating status monitoring device shown in FIG. 1, FIG. 4 is a flow chart showing a process of a monitored computer shown in FIG. 1, FIG. 5 is a flow chart showing a process of the monitored computer shown in FIG. 1, FIG. 6 is a flowchart showing a monitoring-side displaying process executed by an operating status monitoring device shown in FIG. 1, FIG. 7 is a flow chart showing a monitored-side process executed by the operating status monitoring device shown in FIG. 1, FIG. 8 is a flow chart showing a dynamic-mapping-list-update process included in the monitored-side process shown in FIG. 7, FIG. 9 is a flow chart showing a step position specifying process included in the monitoring-side displaying process shown in FIG. 6, FIG. 10 is a flow chart showing a data update process for an operating status map included in the monitoring-side displaying process shown in FIG. 6, FIG. 11 is a flow chart showing an applicable-step-position-displaying process included in the monitoring-side displaying process shown in FIG. 6, FIG. 12 is a flow chart showing a monitoring-side search process executed by the operating status monitoring device shown in FIG. 1, FIG. 13 is a flow chart showing a program name specifying process included in the monitoring-side search process shown in FIG. 12, and FIG. 14 is a flow chart showing a program position displaying process executed by the operating status monitoring device shown in FIG. 1.

DESCRIPTION OF THE PREFERRED EMBODIMENTS

Hereinafter, an embodiment of an operating status monitoring program according to the present invention and an operating status monitoring device to which the program is applied will be described with reference to the drawings. First, an outline of a computer system to which the operating status monitoring program of the embodiment is applied is described with reference to FIG. 1. As shown in FIG. 1, the computer system consists of a monitored computer 10 and an operating status monitoring device (computer) 20 that are connected via a network, or a parallel or serial communication. The operating status monitoring device 20 monitors operating status of the monitored computer 10.

The monitored computer 10 is provided with a CPU 11, a hard disk (HD) 12, a memory (RAM) 13, and a communication adapter 14. The HD 12, the RAM 13, and the communication adapter 14 are connected to the CPU 11. An operating system 12a, a program-counter-reading-process unit 15 that sequentially reads a value of a program counter 11a that counts a logical address of a machine instruction being executed by the CPU 11, a dynamic-arrangement-program-information table 12b, and a plurality of application programs 12c are installed in the HD 12. When the monitored computer 10 starts, the CPU 11 reads the operating system 12a from the HD 12 onto the RAM 13 to execute it, and starts the program-counter-reading-process unit 15 and the application program 12c that is necessary on the operating system.

The operating system 12a manages a logical memory space that expands the limited physical memory area of the RAM 13 by using the predetermined area of the HD 12. Conversion between a physical address and a logical address is automatically executed by the operating system 12a. An execution physical address is converted into an execution logical address by the following calculation.

(Execution logical address)=(Execution physical address)−(Head physical address of program arranged area)+(Program head logical address)

In order to arrange and execute a dynamic arrangement program on the logical memory space that expands the limited physical memory area of the RAM 13, the operating system 12a manages a program name and dynamic arrangement addresses, which consists of head logical address and end logical address, of a dynamic arrangement program using the dynamic-arrangement-program-information table 12b as shown in Table 1, for example. The operating system 12a automatically records the program name concerned and the dynamic arrangement addresses of a program arrangement area.

TABLE 1

| Dynamic arrangement | Dynamic arrangement addresses | |
|---|---|---|
| program name | Head logical address | End logical address |
| DDDD | 0000D000 | 0000D0FF |
| ⋮ | ⋮ | ⋮ |
| EEEE | 0000DA00 | 0000DBFF |
| ⋮ | ⋮ | ⋮ |

Since an application program may consider the logical address only, the process is described based on the logical address with reference to the logical memory space hereinafter. The program counter 11a indicates the execution logical address of the machine instruction that is executed by the CPU 11, and the program-counter-reading-process unit 15 connected to the CPU 11 reads the execution logical address to send it to the operating status monitoring device 20.

Similarly, the program-counter-reading-process unit 15 reads a dynamic arrangement program name and dynamic arrangement addresses of a dynamic arrangement program from the dynamic-arrangement-program-information table 12b to send them to the operating status monitoring device 20.

In the specification, a code written in a high level language such as the COBOL and the C language is referred to as a source program, a module that is obtained by translating (compiling and linking) a source program is referred to as a load module, and the load module that is loaded to the logical memory space of the monitored computer 10 is referred to as an execution module. A step position in the source program is represented by a relative step position whose starting point is a head of the source program concerned, a machine instruction position in the load module is represented by a relative address whose starting point is a head of the module, and a machine instruction in the execution module is represented by an absolute address whose starting point is a head of the logical memory space. The logical addresses such as an "execution logical address" and a "head logical address" represent absolute addresses of the execution module in the logical memory space, and they are distinguished from relative addresses that represent addresses in the load module.

The operating status monitoring device 20 is provided with a CPU 21, a hard disk (HD) 22, a RAM 23, a communication adapter 24 and a display 25. The HD 22, the RAM 23, the communication adapter 24, and the display 25 are connected to the CPU 22. An operating system 22a and an operating status monitoring program 22b that monitors the operating status of the programs in the monitored computer 10 are installed in the HD 22. Further, the HD 22 stores mapping lists 22c and 22f that are used by the operating status monitoring program, a linkage list 22d, and a data table 22e for operating status map that records outputs from the operating status monitoring program 22b.

The mapping list 22c and the linkage list 22d correspond to definition lists that define correspondences between steps in a source program and machine instructions in the execution module, respectively. The mapping list 22c defines the dynamic arrangement addresses in the memory space to which the execution module is mapped. For example, as shown in the following Table 2, it defines head logical addresses and end logical addresses of areas to which the respective execution modules are developed in the logical memory space.

TABLE 2

| Program name | Head logical address | End logical address |
|---|---|---|
| BOOT | 00000000 | 00000FFF |
| OS | 00001000 | 0000FFFF |
| AAAA | 00010000 | 0001FFFF |
| ⋮ | ⋮ | ⋮ |
| XXXX | 000A0004 | 000CFFFE |
| ⋮ | ⋮ | ⋮ |
| ZZZZ | FFFF0000 | FFFFFFFF |

On the other hand, the linkage list 22d defines correspondence between each step in a source program and a relative address of a machine instruction in a load module that is obtained by translating the source program. The linkage list 22d is defined for each of the programs shown in Table 2. For example, the linkage list 22d as shown in the following Table 3 is prepared for the program AAAA in the above-mentioned Table 2. The list includes head and end relative addresses of a machine instruction corresponding to each step, a relative step position whose head step is "0", and a total step number. Since one step in a source program usually corresponds to a plurality of machine instructions, head and end relative addresses are defined to specify a range of machine instructions corresponding to each step.

TABLE 3

| Head relative address | End relative address | Relative step position | Total sum of step numbers |
|---|---|---|---|
| 00000000 | 0000000F | 0 | 4397 |
| 00000020 | 00000027 | 1 | |
| 00000028 | 0000003A | 2 | |
| ⋮ | ⋮ | ⋮ | |
| 0000B030 | 0000B03F | 3007 | |
| ⋮ | ⋮ | ⋮ | |
| 0000FFF8 | 0000FFFF | 4396 | |

The operating status monitoring program 22b specifies which source program is executed and which step in the specified source program is executed by referring to the above-mentioned mapping list 22c and the linkage list 22d based on the execution logical address that is outputted from the program-counter-reading-process unit 15 of the monitored computer 10. That is, the program in which the machine instruction assigned to the execution logical address concerned is included can be specified by referring to the mapping list 22c based on the execution logical address. And then, the step in the source program corresponding to the executed machine instruction can be specified by referring to the linkage list 22d based on the relative address that is calculated by subtracting the head logical address of the execution module from the execution logical address.

For a program whose load module is dynamically arranged to the memory space at the time of execution, the operating status monitoring program 22b prepares a dynamic mapping list 22f as shown in the following Table 4 in order to manage addresses of the arranged area in the memory space. The dynamic mapping list 22f is updated based on the execution logical address outputted from the program-counter-reading-process unit 15 of the monitored computer 10 in advance. Then, the program in which the machine instruction assigned to the execution logical address concerned is included can be specified by referring to the dynamic mapping list 22f based on the execution logical address outputted from the program-counter-reading-process unit 15. And the step corresponding to the executed machine instruction can be specified by referring to the linkage list 22d based on the relative address that is calculated by subtracting the head logical address of the execution module from the execution logical address.

TABLE 4

| Dynamic arrangement program name | Dynamic arrangement addresses | |
|---|---|---|
| | Head logical address | End logical address |
| DDDD | 0000D000 | 0000D0FF |
| : | : | : |
| EEEE | 0000DA00 | 0000DBFF |
| : | : | : |

The operating status monitoring program 22b counts the execution count about the specified step, saves the result in the data table 22e for operating status map, and displays an operating status map M on the display 25 as shown in FIG. 1 based on the data of this table. The data table 22e for operating status map stores the execution count for every step of a source program about all the execution modules defined in the mapping list 22c and the dynamic mapping list 22f. For example, as shown in the following table 5, the data table 22e records a correspondence between an absolute step position that is a unique serial number assigned to every step of all the source programs including dynamic arranged programs, a relative step position that are assigned to steps of each program, and the execution count for every steps. In the Table 5, the steps included in the program AAAA of the Table 2 are surrounded by double lines.

TABLE 5

| Program name | Absolute step position | Relative step position | Execution count |
|---|---|---|---|
| Os | 0 | 0 | a times |
| | 1 | 1 | b times |
| : | : | : | : |
| AAAA | 30000 | 0 | c times |
| : | : | : | : |
| | 33007 | 3007 | d times |
| : | : | : | : |
| | 34396 | 4396 | e times |
| : | : | : | : |
| ZZZZ | 1000000 | 1234 | f times |
| : | : | : | : |
| DDDD | 1001300 | 0 | X times |
| : | : | : | : |

The operating status map M displays square unit marks corresponding to the respective steps in a one-to-one relationship. The marks are arranged so as to form a grid pattern. A displaying pattern of each unit mark is changed in response to the execution count of the corresponding step based on the contents stored in the data table 22e for an operating status map. This enables visual reorganization of the execution frequency for every step. As shown in FIG. 2, the luminosity (shown by the shade in the drawing) of each unit mark is changed according to the execution frequency in this embodiment. A color of a unit mark or a frequency of blink of a unit mark may be changed as the change of the display pattern in place of the change in luminosity. Further, the operating status map M may be printed on a paper by a printer (not shown) in addition to the indication on the display 25.

The unit mark in the operating status map M corresponds to the absolute step position shown in Table 5. In the operating status map M, the absolute step position increases in order from the top to the bottom and from the left to the right in the drawing. That is, as shown in FIG. 3, the unit mark of an upper left corner corresponds to the absolute step position "0", and the unit mark of the upper center position corresponds to the absolute step position "30000". A user can check the execution frequency on a step-by-step basis by seeing the operating status map M displayed on the display 25.

When a user designates a specific step (unit mark), which shows low execution frequency, for example, on the operating status map M, the operating status monitoring program 22b surrounds the unit marks corresponding to all the steps of the execution module containing the designated step by a frame F to distinguish from the steps of other execution modules, and displays the program name as a label L in the map M, as shown in FIG. 3. Thereby, the user can determine which program includes the designated step. This can provide a judgmental standard for deletion by grasping the operating status on a program-by-program basis. A step can be designated by using a pointing device such as a mouse on the screen, or by inputting a numerical value representing the absolute step position.

Subsequently, the flow of the processes executed on the monitored computer 10 and the operating status monitoring device 20 of the embodiment will be described with reference to the flowcharts shown in FIG. 4 through FIG. 14. FIG. 4 and FIG. 5 show the process of the monitored computer 10, and FIG. 6 through FIG. 14 show the process contents of the operating status monitoring program 22b executed on the operating status monitoring device 20. Further, FIG. 6 through FIG. 11 show the process to display the operating status map, FIG. 12 and FIG. 13 show the process about a list output function, and FIG. 14 shows the process about a discriminating display function. The list output function extracts steps whose execution counts are smaller than a predetermined default value from the data table for the operating status map, and outputs the information that specifies the extracted steps and the information that specifies the programs containing the extracted steps as a list. The discriminating display function displays the execution module that includes a designated step so that the steps in the module can be distinguished from the other steps.

The program-counter-reading-process unit 15 of the monitored computer 10 reads the execution logical address of the program counter 11a, and send it to the operating status monitoring device 20. As shown in FIG. 4, the program-counter-reading-process unit 15 waits until an address is written in the program counter 11a (S001). When an address is written, the unit 15 reads the execution logical address in the program counter 11a (S002), and sends it to the operating status monitoring device 20 (S003).

Further, as shown in FIG. 5, the program-counter-reading-process unit 15 waits until a dynamic arrangement program name and dynamic arrangement addresses are written in the dynamic-arrangement-program-information table 12b (S011). When there is the writing, the program-counter-reading-process unit 15 reads the dynamic arrangement program name and the dynamic arrangement addresses from the dynamic-arrangement-program-information table 12b (S012), and send them to the operating status monitoring device 20 (S013).

As shown in FIG. 6, the operating status monitoring program 22b in the operating status monitoring device 20 waits to receive the execution logical address sent from the monitored computer 10 (S101), and reads it when received (S102). Subsequently, subroutines including the step position specifying process (S103) shown in FIG. 9, the data update process for the operating status map (S104) shown in FIG. 10, and the applicable-step-position-displaying process (S105) shown in FIG. 11 are executed in order. The process in S101 corresponds to the detection function that detects execution of a machine instruction. The process of FIG. 9 corresponds to the step position specifying function to specify the step corresponding to the detected machine instruction, the process of FIG. 10 corresponds to the update function to add the execution count of the specified step, and the process of FIG. 11 corresponds to the output function to output the operating status map.

In addition to the above, as shown in FIG. 7, the operating-status monitoring program 22b waits to receive the dynamic arrangement program name and the dynamic arrangement addresses sent from the monitored computer 10 (S111), and reads it when received (S112) at the time of the startup of the dynamic arrangement program. Subsequently, the subroutine of the dynamic-mapping-list-update process (S113) shown in FIG. 7 is executed.

The dynamic-mapping-list-update process shown in FIG. 8 aims to update information stored in the dynamic mapping list 22f. The process judges whether the latest dynamic arrangement addresses read in S121 have been stored in the dynamic mapping list 22f by judging whether the head logical address of the latest dynamic arrangement addresses (referred to as the "latest head logical address") falls within the range between the head logical address and the end logical address of any program that has been recorded as shown in Table 4 (S122, S123). When the latest dynamic arrangement addresses have been stored, the process judges whether these addresses have been assigned to another dynamic arrangement program by checking program names (S124). When the information concerned will be updated, the process reads an end relative address from the linkage list corresponding to the dynamic arrangement program (S125). The process calculates an address W_add by adding the read end relative address to the latest head logical address (S126), and sets the dynamic arrangement program name, the latest head logical address, and the calculated address W_add into the dynamic mapping list 22f as the program name, the head logical address, and the end logical address, respectively (S127). Since the same program may be arranged on the different addresses, the above-mentioned process that functions when the head logical address is different can add the information without exception.

The step position specifying process shown in FIG. 9 aims to specify the step in the source program corresponding to the execution logical address read in S102. First, the process resets a variable "total sum S of step numbers of searched programs" to "0" (S201), and searches the mapping list 22c based on a read execution logical address X_add (S202). Here, the process judges whether the execution logical address X_add falls within the range between the head logical address and the end logical address of any program shown in Table 2 (S203). The judgment is executed on a program-by-program basis in order from the program indicated at the top in Table 2. When not included, the process adds the total step number of the program that contains the step corresponding to the execution logical address X_add to the total sum S of step numbers of searched programs (S204), and confirms whether all the programs in the mapping list 22c have been checked (S210). The process of the steps S202 through S204 is repeated until the program that includes the execution logical address is found.

When the program that includes the execution logical address is found, the operating status monitoring program 22b extracts the program name from the mapping list 22c shown in Table 2 (S205), and calculates a relative address Y_add by subtracting the head logical address of the program (execution module) from the execution logical address x_add (S206) in order to determine which step of the program concerned corresponds to the execution logical address. At this time, a display of a dynamic arrangement program is set as OFF (S216) in order to process a fixed arrangement program that is not a dynamic arrangement. And then, the process searches the linkage list 22d in order of a step using the calculated relative address Y_add (S207), and judges whether the relative address Y_add falls within a range between the head relative address and the end relative address in the linkage list 22d (S208). The process of the steps S207 and S208 is repeated until the condition in S208 is satisfied. When a step whose relative step position falls within the range is found, the relative step position of the step concerned is extracted from the linkage list 22d (S209), and the process returns to FIG. 5.

When there is no applicable program in the mapping list 22c (S210: Yes), the process searches the dynamic mapping list 22f using the execution logical address X_add read as a dynamic arrangement program (S211). Here, the process judges whether the execution logical address X_add falls within the range between the head logical address and the end logical address of any program shown in Table 4 (S212). The judgment is executed on a program-by-program basis in order from the program indicated at the top in Table 4. The process of steps S211 and S212 is repeated until the condition of S212 is satisfied. When the program whose range includes the execution logical address X_add is found, the process extracts the program name from the dynamic mapping list 22f (S213), and calculates a relative address Y_add by subtracting the head logical address of this program (execution module) from the execution logical address X_add (S214). At this time, a display of a dynamic arrangement program is set as ON (S215) in order to process a dynamic arrangement program in the process in FIG. 10, and starts the process from step S207.

The data update process for an operating status map shown in FIG. 10 aims to update the execution count of the data table 22e for an operating status map shown in FIG. 5 about the step specified by the step position specifying process. The process checks the condition of the display of the dynamic arrangement program that is set in S215 or S216 (S305). In the case of "OFF" (S305: Yes), the process reads the total step number S of the searched steps (S301) and reads the relative step position (S302) in order to convert the relative step position specified by the step position specifying process to the absolute step position. In the case of "ON" (S305: No), the process finds the head position (the absolute step position) of the program whose program name is coincident with the name of this dynamic arrangement program from the data table 22e for the operating-status map. Then, the process sets the head position in the total sum S of step numbers of the searched steps (S306). Since the total sum S shows the absolute step position of the head of the source program that includes the executed step, the absolute step position of the executed step can be specified by adding the relative step position of the executed step to the total sum S (S303). Then, the execution count of the specified step is incremented by "1" (S304). Thereby, the data table for the operating status map is updated.

Subsequently, the applicable-step-position-displaying process shown in FIG. 11 calculates the absolute step position by adding the relative step position to the total sum S of the searched steps (S401), reads the execution count X from the operating status map data (S402), determines the luminosity that corresponds to the execution count X based on the luminosity chart shown in FIG. 2 (S403), and sets the luminosity of the unit mark of the step concerned in the operating status map M (S404).

Since the processes of FIG. 5 through FIG. 11 are repeated, execution of a step of a program updates the execution count in the data table 22 for the operating status map, and changes the luminosity of the unit mark in the operating status map M displayed on the display 25. A user can grasp the operating status of the program installed in the monitored computer 10 on a step-by-step basis by executing the above-mentioned process in a predetermined period of time.

Next, a process to extract a step whose execution count is lower than the predetermined count using the operating status map M displayed on the display 25 will be described with reference to FIG. 12 and FIG. 13. First, a user establishes a threshold count Y as a threshold of extraction (S501). The operating status monitoring program 20b searches the data table 22e for the operating status map on a step-by-step basis in an arrangement order based on the threshold count Y (S502).

That is, the program reads the execution count of the step concerned from the data table 22e for the operating status map, and determines whether the execution count of the step is lower than the threshold count Y (S503). When the execution count is lower than the threshold count Y, the program extracts the absolute step position from the data table 22e for the operating status map (S504), and executes the program name specifying process shown in FIG. 13 (S505). This process will be described below. When the program name is specified, this program name and the execution count of the step concerned are stored (S506), and the relative step position of the step concerned is extracted from the data table 22e for the operating status map and it is stored (S507). When the execution count is larger than the threshold count Y (S503, No), the process of steps S504 through S507 for specifying a step is skipped. Since the process of these steps S502 through S507 is executed for all the steps registered in the data table 22e for the operating status map, all the steps whose execution counts are smaller than the threshold count Y are extracted.

When the check of the execution count is completed about all the steps registered in the data table 22e for the operating status maps (S508, Yes), all of the program names, the relative step positions, and the execution that are stored are read (S509, S510, and S511). And then, the list including the program names, the relative step positions, and the execution counts that are read are outputted (S512). The list may be displayed on the display 25 and may be printed on paper. The user can grasp the steps whose execution counts are small with reference to the list. Therefore, the user can use the list as a data to cancel redundant region in each source program. For example, the user can review a logic of a part of a source program that includes a step whose execution count is small, can delete a step whose execution counts is "0".

As shown in FIG. 13, the program name specifying process executed in S505 aims to specify which program includes the absolute step position extracted in S504. First, the process resets the total sum S of step numbers of the searched programs to "0" (S601), and reads the absolute step position (S602). Next, the process searches the mapping list 22c in the arrangement order, and extracts the total step number of each program from the linkage list 22d one by one (S603).

And then, the process adds the total step number of the extracted program to the total sum S of step numbers of the searched programs (S604), and determines whether the absolute step position is smaller than this total sum S (S605). The absolute step position is larger than the total sum of the step numbers of the programs that are arranged before the program including the step concerned, and is smaller than the total sum when the total step number of the program including the step concerned is added. Therefore, when the process repeatedly determines whether the absolute step position is smaller than the total sum S with adding the total step number of the program, it turns out that the latest added program includes the step indicated by the absolute step position concerned at the time when the total sum S is smaller than the absolute step position. Thus, the process extracts the program name of this program from the mapping list 22c (S606), and returns to the process of FIG. 12.

Next, the program position displaying process shown in FIG. 14 is described. When a user designates a unit mark corresponding to a specific step in the operating status map M displayed on the display 25 by executing the monitoring-side displaying process shown in FIG. 6, the program position displaying process indicates a program area including the specific step on the map and displays a name of the program. The process of steps S701 through S707 to specify the program name based on the absolute step position is identical to the program name specifying process shown in FIG. 13. However, in the process of FIG. 14, a process in step S704 is added in order to specify the absolute step position indicating the head of the program concerned. In step S704, the total sum S of step numbers of the searched programs before adding the total step number of the program concerned is saved in a work W.

If the program name is extracted in S707, the process establishes the absolute step position saved to the work W as the absolute address position of the head of the program concerned, and establishes the total sum S after adding the total step number of the program concerned as the absolute address position of the end of the program concerned (S708). And then, the process displays a frame F that surrounds the area from the unit mark corresponding to the head absolute step position to the unit mark corresponding to the end absolute step position (S709) and displays the program name as a label L appending to the frame (S710) in the map M, as shown in FIG. 3. Thereby, the user can confirm the area and the name of the program that includes the step represented by the absolute step position on the operating status map M displayed on the display 25. This can provide a judgmental standard for deletion by grasping the operating status on a program-by-program basis.

What is claimed is:

1. An operating status monitoring method for monitoring operating status of a program executed by a computer, comprising:
   detecting execution of a machine instruction included in an execution module that is obtained by translating a source program into machine language and is mapped to a memory space;
   updating, when the execution module is a dynamic arrangement program that is not mapped to a fixed absolute address in the memory space and receiving a name of the dynamic arrangement program and a dynamic arrangement address from a monitored computer, a name of the dynamic arrangement program and an absolute address in the memory space to which the execution module is mapped, in a dynamic mapping list which defines correspondence between the name of the dynamic arrangement program and the absolute address in the memory space, based on the name of the dynamic arrangement program and the dynamic arrangement address which are received from the monitored computer;

referring to the dynamic mapping list and a mapping list that defines an absolute address in the memory space to which the execution module is mapped based on the absolute address of the detected machine instruction to specify the program that includes the detected machine instruction;

calculating a relative address by subtracting an absolute address of the head of the execution module from the absolute address of the detected machine instruction;

referring to a linkage list that defines correspondence between each step in the source program and a relative address of a machine instruction in a load module that is obtained by translating the source program into machine language based on the relative address calculated to specify the step corresponding to the detected machine instruction;

updating a data table for an operating status map, which defines correspondence between each step of in the source program and an execution count of the step, by adding the execution count of the specified step in the data table; and outputting an operating status map in which execution count of each step can be visually recognized by arranging unit marks each of which corresponds to each step in a one-to-one relationship and by changing a displaying pattern of each unit mark in response to the execution count of the corresponding step based on the contents stored in the data table for an operating status map.

2. The operating status monitoring method according to claim 1, further comprising:

extracting steps whose execution counts are smaller than a predetermined default value from the data table for the operating status map; and outputting an information that specifies the extracted steps and an information that specifies the programs containing the steps as a list.

3. The operating status monitoring method according to claim 1, wherein the outputting shows the operating status map on a display connected to the computer, and changes the luminosity or the color of a unit mark according to the execution count.

4. The operating status monitoring method according to claim 3, further comprising:

displaying the unit marks corresponding to all the steps of the program that contains a step designated by a user so as to discriminate from the unit marks corresponding to steps of another execution module.

5. A non-transitory computer readable medium storing an operating status monitoring program for monitoring operating status of a program executed by a computer, the program comprising computer-executable instructions to perform:

detecting execution of a machine instruction included in an execution module that is obtained by translating a source program into machine language and is mapped to a memory space;

updating, when the execution module is a dynamic arrangement program that is not mapped to a fixed absolute address in the memory space and receiving a name of the dynamic arrangement program and a dynamic arrangement address from a monitored computer, a name of the dynamic arrangement program and an absolute address in the memory space to which the execution module is mapped, in a dynamic mapping list which defines correspondence between the name of the dynamic arrangement program and the absolute address in the memory space, based on the name of the dynamic arrangement program and the dynamic arrangement address which are received from the monitored computer;

referring to the dynamic mapping list and a mapping list that defines an absolute address in the memory space to which the execution module is mapped based on the absolute address of the detected machine instruction to specify the program that includes the detected machine instruction;

calculating a relative address by subtracting an absolute address of the head of the execution module from the absolute address of the detected machine instruction;

referring to a linkage list that defines correspondence between each step in the source program and a relative address of a machine instruction in a load module that is obtained by translating the source program into machine language based on the relative address calculated to specify the step corresponding to the detected machine instruction;

updating a data table for an operating status map, which defines correspondence between each step in the source program and an execution count of the step, by adding the execution count of the specified step in the data table; and outputting an operating status map in which execution count of each step can be visually recognized by arranging unit marks each of which corresponds to each step in a one-to-one relationship and by changing a displaying pattern of each unit mark in response to the execution count of the corresponding step based on the contents stored in the data table for an operating status map.

6. The non-transitory computer readable medium storing the operating status monitoring program according to claim 5, the program comprising computer-executable instructions to further perform:

extracting steps whose execution counts are smaller than a predetermined default value from the data table for the operating status map; and outputting an information that specifies the extracted steps and an information that specifies the programs containing the steps as a list.

7. The non-transitory computer readable medium storing the operating status monitoring program according to claim 5, wherein the outputting shows the operating status map on a display connected to the computer, and changes the luminosity or the color of a unit mark according to the execution count.

8. The non-transitory computer readable medium storing the operating status monitoring program according to claim 7, the program-comprising computer-executable instructions to further perform:

displaying the unit marks corresponding to all the steps of the program that contains a step designated by a user so as to discriminate from the unit marks corresponding to steps of another execution module.

9. An operating status monitoring device for monitoring operating status of a program, comprising:

a memory; and a processor connected to the memory, wherein the processor is configured to operate in accordance with executable instructions that, when executed, cause the processor to perform:

detecting execution of a machine instruction included in an execution module that is obtained by translating a source program into machine language and is mapped to a memory space;

updating, when the execution module is a dynamic arrangement program that is not mapped to a fixed absolute address in the memory space and receiving a name of the dynamic arrangement program and a dynamic arrangement address from a monitored computer, a name of the dynamic arrangement program and an absolute address in the memory space to which the execution module is mapped, in a dynamic mapping list which defines correspondence between the name of the dynamic arrangement program and the absolute address in the memory space, based on the name of the dynamic arrangement program and the dynamic arrangement address which are received from the monitored computer;

referring to the dynamic mapping list and a mapping list that defines an absolute address in the memory space to which the execution module is mapped based on the absolute address of the detected machine instruction to specify the program that includes the detected machine instruction;

calculating a relative address by subtracting an absolute address of the head of the execution module from the absolute address of the detected machine instruction;

referring to a linkage list that defines correspondence between each step in the source program and a relative address of a machine instruction in a load module that is obtained by translating the source program into machine language based on the relative address calculated to specify the step corresponding to the detected machine instruction;

updating a data table for an operating status map, which defines correspondence between each step in the source program and an execution count of the step, by adding the execution count of the specified step in the data table; and outputting an operating status map in which execution count of each step can be visually recognized by arranging unit marks each of which corresponds to each step in a one-to-one relationship and by changing a displaying pattern of each unit mark in response to the execution count of the corresponding step based on the contents stored in the data table for an operating status map.

10. The operating status monitoring device according to claim 9, wherein the program further including:

extracting steps whose execution counts are smaller than a predetermined default value from the data table for the operating status map; and outputting an information that specifies the extracted steps and an information that specifies the programs containing the steps as a list.

11. The operating status monitoring device according to claim 9, wherein the outputting shows the operating status map on a display connected to the computer, and changes the luminosity or the color of a unit mark according to the execution count.

12. The operating status monitoring device according to claim 11, wherein the program further including:

displaying the unit marks corresponding to all the steps of the program that contains a step designated by a user so as to discriminate from the unit marks corresponding to steps of another execution module.

* * * * *